(12) United States Patent
Xiang

(10) Patent No.: US 7,226,895 B2
(45) Date of Patent: Jun. 5, 2007

(54) DRILLING FLUID SYSTEMS FOR REDUCING CIRCULATION LOSSES

(75) Inventor: Tao Xiang, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 399 days.

(21) Appl. No.: 10/818,594

(22) Filed: Apr. 6, 2004

(65) Prior Publication Data

US 2005/0221994 A1    Oct. 6, 2005

(51) Int. Cl.
*C09K 8/00* (2006.01)
*C09K 8/20* (2006.01)
*C09K 8/035* (2006.01)
*E21B 41/02* (2006.01)
*E21B 43/16* (2006.01)

(52) U.S. Cl. .......... 507/140; 507/104; 507/106; 507/204; 507/206; 507/269; 166/244.1; 166/268

(58) Field of Classification Search .......... 507/140
See application file for complete search history.

(56) References Cited

U.S. PATENT DOCUMENTS

| | | | |
|---|---|---|---|
| 2,705,050 A | 3/1955 | Davis | |
| 2,788,323 A * | 4/1957 | Brakel et al. ........ | 507/140 |
| 3,202,214 A | 8/1965 | McLaughlin | |
| 3,216,962 A | 11/1965 | Gatza | |
| 3,237,691 A | 3/1966 | Koch | |
| 3,500,928 A | 3/1970 | Rockwell | |
| 3,936,408 A | 2/1976 | Adams et al. | |
| 4,083,407 A | 4/1978 | Griffin, Jr. | |
| 4,102,400 A | 7/1978 | Crinkelmeyer | |
| 4,353,804 A | 10/1982 | Green et al. | |
| 4,411,800 A | 10/1983 | Green et al. | |
| 4,468,334 A | 8/1984 | Cox et al. | |
| 4,474,667 A | 10/1984 | Block | |
| 4,567,946 A | 2/1986 | Watanabe | |
| 4,662,448 A | 5/1987 | Ashford et al. | |
| 4,799,549 A | 1/1989 | Vinot et al. | |
| 4,838,352 A | 6/1989 | Oberste-Padtberg | |
| 4,888,120 A | 12/1989 | Mueller et al. | |
| 5,380,447 A * | 1/1995 | Kirk et al. ........ | 510/276 |
| 5,380,469 A | 1/1995 | Flider | |
| 5,552,377 A | 9/1996 | Kindred | |
| 5,981,447 A | 11/1999 | Chang et al. | |
| 6,165,947 A | 12/2000 | Chang et al. | |
| 6,342,467 B1 | 1/2002 | Chang et al. | |
| 6,475,959 B1 | 11/2002 | Lange et al. | |
| 6,855,671 B2 * | 2/2005 | Norfleet et al. ........ | 507/120 |
| 2002/0128158 A1 | 9/2002 | Green | |
| 2002/0137635 A1 | 9/2002 | Langlois | |
| 2002/0147113 A1 | 10/2002 | Green | |
| 2003/0080604 A1 | 5/2003 | Vinegar | |

FOREIGN PATENT DOCUMENTS

| | | |
|---|---|---|
| CA | 2118819 | 9/1994 |
| EP | 0 272 709 A1 | 6/1988 |
| EP | 272709 | 6/1988 |
| WO | WO 99/03948 | 1/1999 |
| WO | WO 2001081498 | 11/2001 |

OTHER PUBLICATIONS

Shimada, et al., Effect of the Chemical Grout Injection on the Surrounding Soil in the Construction of Underground Pipelines in Using Slurry Pipe-jacking, Proceedings of 20th Int. NO-DIG Conference, May 28-31, 2002, Copenhagen, Denmark.
Department of the Army. U.S. Army Corps of Engineers, Chapter 2—Chemical Grout Materials, Engineering and Design—Chemical Grouting, Jan. 31, 1995, pp. 34, Publ. No. EM 1110-1-3500, Department of the Army. U.S. Army Corps of Engineers.

* cited by examiner

*Primary Examiner*—Randy Gulakowski
*Assistant Examiner*—Timothy J. Kugel
(74) *Attorney, Agent, or Firm*—Paula D. Morris; The Morris Law Firm, P.C.

(57) ABSTRACT

A circulation loss combination for water-based drilling fluid system(s) comprising: a first amount of alkali metal silicate; a second amount of water insoluble particulate; and, a quantity of water soluble activating agent effective to reduce the pH of the water-based drilling fluid system to a value sufficiently low to form an effective circulation loss structure at a desired period of time after addition to the water-based drilling fluid system.

72 Claims, No Drawings

DRILLING FLUID SYSTEMS FOR REDUCING CIRCULATION LOSSES

FIELD OF THE APPLICATION

The present application relates to drilling fluid systems and methods for using same to reduce circulation losses during drilling operations.

BACKGROUND

Compositions and methods are needed to control circulation losses of drilling fluid systems while drilling, particularly during drilling of high permeability formations.

SUMMARY

The present application provides a circulation loss combination for water-based drilling fluid system(s) comprising: a first amount of alkali metal silicate; a second amount of water insoluble particulate; and, a quantity of water soluble activating agent effective to reduce the pH of the water-based drilling fluid system to a value sufficiently low to form an effective circulation loss structure at a desired period of time after addition to the water-based drilling fluid system.

DETAILED DESCRIPTION

Sodium silicate has been successfully used as a chemical grouting material for many years. For example, when an aqueous mixture of sodium silicate and an activating agent, such as an ester, are injected into the ground, the silicate solution reacts to form a colloid which polymerizes further to form a gel. The gel provides increased strength, stiffness, and reduced permeability in predominantly granular soils.

The present application uses the foregoing properties of silicates in water based drilling fluid systems to prevent fluid loss while drilling high permeability formations, particularly during drill-in and completion operations. The gel produced by the silicate reaction is soluble in both acids and bases.

The phrase "water-based" includes any fluid system comprising water or a water-based solution as the continuous phase, including oil-in-water and oil-in-brine emulsions.

The application provides drilling fluid systems comprising a circulation loss combination comprising alkali metal silicate(s), activating agent(s), and particulate(s). The circulation loss combination is effective to produce reduced circulation loss compared to a control consisting of the same drilling fluid system in the absence of the circulation loss combination. Although any improvement in circulation loss is encompassed by the present application, it is preferred that the reduction in circulation loss is a reduction to 40% or less of the circulation loss experienced by the control when measured through a 100 Darcy disk at 250° F. More preferably, the reduction in circulation loss is to 50% or less of the of the circulation loss experienced by the control, even more preferably 80% or less of the of the circulation loss experienced by the control, even more preferably 90% or less of the circulation loss experienced by the control.

The phrase "drilling fluid system" refers to fluid systems or components thereof which are "useful during drilling operations." "Drilling fluid systems" include but are not necessarily limited to systems that are useful during "drilling," "drill-in," "completion," "workover," "cementing," "well-servicing," and "gravel-packing" operations. Preferred "drilling fluid systems" are drill-in fluid systems and completion fluid systems.

In one embodiment, the drilling fluid system is an aqueous fluid system comprising water, alkali metal silicate, activating agent, and particulate. The alkali metal silicate may comprise any alkali metal, including but not necessarily limited to lithium, sodium, potassium, rubidium, cesium, and francium. Preferred alkali metals include, but are not necessarily limited to lithium, sodium, and potassium, more preferably sodium and potassium, most preferably sodium.

The alkali metal silicate is used in the drilling fluid system at a concentration of about 1 vol. % or more, preferably about 2 vol. % or more, more preferably about 3 vol. % or more. The upper limit on amount of alkali metal silicate depends on the gel strength desired and the pore size in the formation. The bigger the pore size in the formation, the higher the gel strength desired and, generally, the higher the desired concentration of alkali silicate. As a practical matter, the concentration of alkali silicate generally is about 40% because most commercial silicate is about 40% water solution.

At the foregoing concentrations, alkali metal silicate solutions are alkaline. The drilling fluid system comprises one or more activating agent(s) effective to reduce the pH of the solution to a level sufficiently low to induce gellation after a desired period of time. As the alkaline solution is neutralized, colloidal silica aggregates to form a gel. Depending upon the temperature, gellation generally begins when the solution reaches a pH of about 11 or lower, typically lower.

The amount of activating agent and the type of activating agent are variable to achieve the desired pH reduction over the desired period of time. In a preferred embodiment, the onset of gellation is delayed by one or more of a combination of gellation control factors comprising: (a) maintaining the silicate and activating agent separate before use; (b) maintaining the silicate and/or the activating agent separate from the remainder of the drilling fluid system until use; (c) verifying initial alkalinity of the drilling fluid system; (d) continual movement of the final drilling fluid system until gellation is desired; and, (e) using an activating agent (i) which is sufficiently diluted, and/or (ii) which reacts slowly.

The activating agent may be any activating agent effective to reduce the pH of the particular drilling fluid system to the desired level over the desired period of time. Most organic activating agents react slowly and generally are preferred.

In an aqueous base drilling fluid system, preferred activating agents include, but are not necessarily limited to agents that hydrolyze under use conditions, thereby decreasing the pH from an initial pH to a predetermined pH within a predetermined time period. Exemplary activating agents include, but are not necessarily limited to water soluble alkyl esters of aliphatic saturated or unsaturated monocarboxylic, dicarboxylic, and polycarboxylic acids and salts thereof; alkyl esters of carbocyclic carboxylic acids and salts thereof; dialkyl and/or trialkyl phosphates; lactones; lower alkylamides; ketoesters; and, carbonates and bicarbonates. Preferred activating agents are water soluble alkyl amides and alkyl esters. A preferred alkyl amide is formamide. A preferred alkyl ester is ethyl ester.

Accelerating agents may be used to accelerate gel formation after initiation. Suitable accelerating agents are water soluble salts. A preferred accelerating agent is sodium aluminate.

The drilling fluid system also comprises water insoluble particulate(s). The water insoluble particulate(s) have a composition and mesh size effective to associate with gelling and/or gelled alkali metal silicate to form an effective circulation loss structure while maintaining effective rheology and pumpability of the remaining drilling fluid system. Preferred particulate mesh sizes are from about 10 to about 500 mesh, preferably from about 100 to about 200 mesh.

Preferred particulates are bridging agents and/or weighting agents, more preferably bridging agents. Suitable particulates are made of a variety of materials, including, but are not necessarily limited to alkaline earth metal salts; metals and metal oxides; silica; and ceramics. Suitable metal oxide particulates include, but are not necessarily limited to iron oxide, manganese oxide, barite, and hematite. Preferred particulates are alkaline earth metal salts and organic fibers. Preferred alkaline earth metal salts are carbonates. Suitable organic fibers are cellulosic fibers and "high lignin lost circulation materials" (HLLCM's), such as those described in U.S. Patent Application Publication No. 20030158045, incorporated herein by reference.

Suitable cellulosic fibers include, but are not necessarily limited to corn cob, nut shells, seeds, pith, grape pumice, bulrush plants, lignin byproducts from processing plant material into paper, and high lignin lost circulation materials (HLLCMs). A most preferred organic fiber blend comprises about 75 wt. % ground corn cob and about 25 wt. % of second organic fiber material. Suitable second organic fiber materials include, but are not necessarily limited to ground nut shells and wood flour. Suitable nut shells include but are not necessarily limited to pecan shells and walnut shells. The mesh size of the particles will vary depending upon the application. One embodiment comprises about 50 wt. % ground corn cob having a mesh size of from about 8 to about 20; 25 wt. % ground corn cob having a mesh size of about 20 mesh; and about 25 wt. % coarse pith. Preferably, the organic fiber has about 10 wt. % or less moisture. A suitable sieve analysis is:

| Sieve Analysis, % through | |
|---|---|
| 20 mesh | 95 min. |
| 100 mesh | 75 min. |
| 200 mesh | 20–60 |

A suitable coarse-grained sieve analysis is:

| Sieve Analysis, % through | |
|---|---|
| 8 mesh | 95 min. |
| 60 mesh | 35 max. |
| 200 mesh | 5 min. |

A preferred commercially available organic fiber material is CHEK-LOSS, which is commercially available from Baker Hughes INTEQ.

Most preferred particulates are bridging agents, which include, but are not necessarily limited to ground marble or calcium carbonate particles, such as MIL-CARB, available from Baker Hughes INTEQ. Calcium carbonate has the advantage that it is acid soluble, and therefore can be removed from the formation by acid flushing. The drilling fluid system comprises from about 5 lb to about 200 lb of the particulate per barrel of drilling fluid system, preferably about 20 lb/bbl.

Gellation of a typical drilling fluid system generally is desired after a period of about 1 hr. An exemplary drilling fluid system suitable to achieve gellation after 5 hrs. comprises from about 1 vol. % to about 20 vol. % alkali metal silicate, from about 0.1 vol. % to about 20 vol. % activating agent, and from about 5 lb/bbl to about 200 lb/bbl. particulate. A preferred embodiment is an aqueous base drilling fluid system comprising from about 2 vol. % to about 10 vol. % sodium silicate, from about 0.1 vol. % to about 5 vol. % alkyl ester, and from about 5 lb/bbl. to about 50 lb/bbl. calcium carbonate preferably having a mesh size of from about 100 to about 200 mesh.

A most preferred drilling fluid system for drill-in and completion fluid systems comprises an aqueous base drilling fluid system consisting essentially of from about 2 vol. % to about 5 vol. % sodium silicate, from about 1 vol. % to about 3 vol. % alkyl ester, from about 10 lb/bbl. to about 30 lb/bbl. calcium carbonate. In a preferred embodiment, this system comprises from about 0.1 vol. % to about 2 vol. % water soluble polymer.

A most preferred drilling fluid system for drill-in and completion fluid systems comprises sodium silicate at about 2 vol. % or more, most preferably about 2.7 vol. % (preferably about 40% active) and a substantially stoichiometric amount (about 1.3 vol. %) activating agent (preferably alkyl ester), in combination with about 20 lb/bbl calcium carbonate. Most preferably, the fluid system further comprises about 1.5 lb/bbl water soluble polymer, most preferably partially hydrolyzed polyacrylamide (PHPA).

The alkali metal silicate, the particulate, and/or the water soluble polymer may be an integral component of substantially any water based drilling fluid system, or may be added to the water based fluid system during drilling operations, e.g., by injection into the pump suction, or addition to a mud pit. The activating agent preferably is added separately during drilling operations.

In order to be effective for use during drilling operations, the particular fluid system must have effective rheological and fluid loss control properties. Viscosity and fluid loss preferably are controlled in the fluid systems by adding certain polymers to the fluid. The fluid system preferably contains polymers that are capable of viscosifying the drilling fluid system and/or providing filtration control for the drilling fluid system. Preferred polymers are non-toxic and depend upon the base fluid.

"Water-soluble polymers" are defined as polymers that are capable of viscosifying a water base drilling fluid system and/or providing filtration control for a drilling fluid system. Preferred water soluble polymers are XAN-PLEX™ D, BIO-PAQ™ and/or BIOLOSE™, all of which are commercially available from Baker Hughes INTEQ.

Suitable water-soluble polymers also include, but are not necessarily limited to water-soluble starches and derivatized versions thereof, water soluble gums and derivatized versions thereof, and water-soluble celluloses. Starches that are suitable for use in the present drilling fluid system include, but are not necessarily limited to corn based and potato based starches, preferred starches being more temperature stable starches. Gums that are suitable for use in the present drilling fluid system include, but are not necessarily limited to xanthan gums, wellan gums, scleroglucan gums, and guar gums. These polymers are widely available from commercial sources.

As used herein, the terms "derivatized starches" and "derivatized gums" refer to starches and gums that have been derivatized in a manner that renders them inherently non-fermentable in order to avoid the need for a preservative. Water-soluble "derivatized starches" and "derivatized gums" that should operate successfully include, but are not necessarily limited to: hydroxyalkyl starches and gums;

starch and gum esters; cross-link starches and gums; hypochlorite oxidized starches and gums; starch and gum phosphate monoesters; starch and gum xanthates; and, dialdehyde starches and gums. These derivatized starches and gums can be manufactured using known means, such as those set forth in detail in Chapter X of *Starch: Chemistry and Technology* 311–388 (Roy L. Whistler, et al. eds., 1984), incorporated herein by reference.

Specific examples of suitable derivatized starches and gums that fall within the foregoing categories include, but are not necessarily limited to: carboxymethyl starches and gums; hydroxyethyl starches and gums; hydroxypropyl starches and gums; hydroxybutyl starches and gums; carboxymethylhydroxyethyl starches and gums; carboxymethylhydroxypropyl starches and gums; carboxymethylhydroxybutyl starches and gums; polyacrylamide starches and gums; and, other starch and gum copolymers.

Preferred viscosifying polymers for use in the system include, but are not necessarily limited to polysaccharide viscosifying polymers, such as XAN-PLEX™, XAN-PLEX D™, XANVIS™, all of which are available from Baker Hughes INTEQ. A most preferred viscosifying polymer is XAN-PLEX™ D, available from Baker Hughes INTEQ. The fluid preferably comprises from about 0.25 ppb to about 2 ppb, preferably about 0.25 ppb of the viscosifying polymer.

Another type of water soluble polymer used in the system is a filtration control polymer. Preferred filtration control polymers are BIO-PAQ™, BIOLOSE™, and combinations thereof. Most preferred filtration control polymers are modified polysaccharides, most preferably BIO-PAQ™. BIO-PAQ™ and BIOLOSE™ are commercially available from Baker Hughes INTEQ. The fluid preferably contains from about 2 to about 10 lb/bbl, preferably about 2 lb/bbl filtration control polymer.

The drilling fluid system may contain "polyacrylamide copolymers" to provide shale inhibition, among other things. Suitable polyacrylamide copolymers are commercially available from a number of sources, and include but are not necessarily limited to HYPERDRILL CP-904L™, available from Hychem, Inc., Tampa, Fla., and SUPER-FLOC™, available from Cytec Industries, West Patterson, N.J. A preferred polyacrylamide copolymer is DFE-243, which comprises partially hydrolyzed polyacrylamide (PHPA) and trimethylaminoethyl acrylate, which has about a 800,000 to 1 million molecular weight and about a 5% to about a 10% cationic charge density. DFE-243 is commercially available from Baker Hughes INTEQ. A preferred drilling fluid system for use with the circulation loss combination herein is NEW-DRILL® PLUS, which is commercially available from Baker Hughes INTEQ.

Other conventional additives may be used in the drilling fluid system. Such additives include, but are not necessarily limited to shale stabilizer(s), filtration control additive(s), suspending agent(s), dispersant(s), thinner(s), anti-balling additive(s), lubricant(s), weighting agent(s), seepage control additive(s), lost circulation additive(s), drilling enhancer(s), penetration rate enhancer(s), corrosion inhibitor(s), acid(s), base(s), buffer(s), scavenger(s), gelling agent(s), crosslinker(s), catalyst(s), soluble salts, biocides, and combinations thereof. Suitable shale stabilizers include, but are not necessarily limited to PHPA, polyglycols, inorganic salts, chelates, amines, alkanolamines, alkanolamides, amphoteric compounds, alone or in aqueous solutions, and mixtures thereof. Suitable shale stabilizing inorganic salts include, but are not necessarily limited to alkali metal salts, silicate salts, and aluminum salts. Acids include acids used to treat cement contamination.

After mixing using conventional methods, the initial pH of a drilling fluid system is measured and, if needed, adjusted using a suitable buffer. If the drilling fluid system includes the alkali metal silicate, the initial pH typically is from about 11 to about 12.5, preferably about 11.5. Substantially any buffer may be used to adjust the initial pH as long as the buffer does not interfere with gellation of the silicate and does not adversely affect rheology. Suitable buffers include, but are not necessarily limited to alkanolamines, alkali metal hydroxides, preferably sodium or potassium hydroxide, alkali metal acetates, preferably sodium or potassium acetate. A preferred buffer is NaOH.

Preferred drilling fluid systems are "non-toxic." As used herein, the term "non-toxic" is defined to mean that a material meets the applicable EPA requirements for discharge into U.S. waters. Currently, a drilling fluid system must have an $LC_{50}$ (lethal concentration where 50% of the organisms are killed) of 30,000 parts per million (ppm) suspended particulate phase (SPP) or higher to meet the EPA standards.

The application will be better understood with reference to the following Example, which is illustrative only:

EXAMPLE 1

A drilling fluid system was prepared using the materials and procedures shown in the following Table. The components were mixed for 20 minutes at 4000 rpm. Standard API procedures were used to determine fluid loss through 90 micron Darcy disk at 250° F. with the following results:

| Pilot Testing Sodium Silicate/Ester as Lost Circulation Material | | |
|---|---|---|
| Component | Control | Candidate |
| Water, bbl | 1 | 0.96 |
| NEW-DRILL ® PLUS, lb/bbl | 1.5 | 1.5 |
| MIL-CARB, lb/bbl | 20 | 20 |
| Sodium Silicate, % by | — | 2.7 |
| Ethyl Ester, % | — | 1.3 |
| Mixing 20 minutes at 4000 rpm | | |
| HTHP at 250° F. using 90 micron disk | | |
| After heating for 90 minutes | | |
| HTHP at 250° F. | 50 ml/20 sec | 25 ml/7.5 min |

*NEW-DRILL ® PLUS is a drilling fluid system which is commercially available from Baker Hughes INTEQ.

The control lost 50 ml. during the first 20 seconds. The candidate sample lost only 25 ml., or one half as much fluid, over the 7.5 minute duration of the test. The foregoing represents a reduction in fluid loss rate of from about 300 ml/minute to about 3 ml/minute.

EXAMPLE 2

A drilling fluid system was prepared using the materials shown in the following Table to evaluate the compatibility of sodium silicate with the particulates in CHEK-LOSS™, a Baker Hughes INTEQ lost circulation control product. The components were mixed for 10 minutes at 4000 rpm. Standard API procedures were used to determine fluid loss through a 90 micron Darcy disk at 150° F. with the following results:

| Compatibility of Sodium Silicate/Ester with CHEK-LOSS | |
|---|---|
| Component | Quantity |
| Water, ml | 200 |
| NEW-DRILL ® PLUS, g | 1 |
| Sodium Silicate (40% active), ml | 6 |
| Ethyl Ester, ml | 2 |
| CHEK-LOSS, g | 8 |
| After mixing 10 minutes at 4000 rpm, static aging at 150° F. | |
| 1 hour | Flowable |
| 2 hours | Flowable |
| 3 hours | Gel foams |

*CHEK-LOSS is an organic fiber blend comprising about 75 wt. % ground corn cob and about 25 wt. % ground walnut.

EXAMPLE 3

A drilling fluid system was prepared using the materials shown in the following Table to evaluate whether $NaAlO_2$ was effective to accelerate gellation. The components were mixed for 10 minutes at 4000 rpm. Standard API procedures were used to determine fluid loss through 90 micron Darcy disk at 150° F. with the following results:

| Effect of Sodium Aluminate on the Gellation Rate of Sodium Silicate/Ester | | |
|---|---|---|
| Component | Control | Test Candidate |
| Water, ml | 200 | 200 |
| MIL-PAC R, g | 1 | 1 |
| $NaAlO_2$ | — | 1 |
| Sodium Silicate (40% active), ml | 10 | 10 |
| Ester, ml | 5 | 5 |
| After mixing 10 minutes at 4000 rpm, static aging at 150° F. | | |
| 10 minutes | Clear solution | Solution starts clouded but flowable |
| 30 minutes | Solution starts clouded but flowable | Gel forms |
| 60 minutes | Gel forms | |

The foregoing demonstrates that NaAlO2 accelerated gellation rate.

Persons of ordinary skill in the art will recognize that many modifications may be made to the methods and compositions described in the present application without departing from the spirit and scope of the present application. The embodiment described herein is meant to be illustrative only and should not be taken as limiting the "invention," which is defined in the claims.

I claim:

1. A drilling fluid system comprising:
   a water based-drilling fluid system having effective rheology and fluid loss control properties, the water based-drilling fluid system comprising a circulation loss combination;
   wherein the circulation loss combination comprises:
   a first amount of alkali metal silicate;
   a second amount of water insoluble particulate; and,
   from about 0.1 vol. % to about 20 vol. % of water soluble activating agent effective to reduce the pH of the water-based drilling fluid system to a value sufficiently low to form an effective circulation loss structure at a desired period of time after addition to the water-based drilling fluid system.

2. The drilling fluid system of claim 1 wherein the alkali metal silicate and the water insoluble particulate are integral components of the water-based drilling fluid system and the water soluble activating agent comprises a separate additive.

3. The drilling fluid system, of claim 2 wherein the concentration of alkali metal silicate in the drilling fluid system is about 1 vol. % or more.

4. The drilling fluid system of claim 3 wherein the concentration of ailcali metal silicate is about 20 vol. % or less.

5. The drilling fluid system of claim 3 wherein the activating agent is one or more organic activating agent.

6. The drilling fluid system of claim 2 wherein the concentration of alkali metal silicate in the drilling fluid system is about 2 vol. % or more.

7. The drilling fluid system of claim 6 wherein the activating agent is organic activating agent.

8. The drilling fluid system of claim 2 wherein the alkali metal is selected from the group consisting of lithium, sodium, and potassium.

9. The drilling fluid system of claim 2 wherein the concentration of alkali metal silicate in the drilling fluid system is about 3 vol. % or more.

10. The drilling fluid system of claim 2 comprising about 20 lb/bbl of the water insoluble particulate wherein the water insoluble particulate comprises calcium carbonate particles.

11. The drilling fluid system of claim 2 wherein the drilling fluid system is selected from the group consisting of a drilling fluid system, a drill-in fluid system, a completion fluid system, a workover fluid system, a cementing fluid system, a well-servicing fluid system, a gravel-packing fluid system, a spotting fluid system, and an additive fluid system.

12. The drilling fluid system of claim 2 wherein the drilling fluid system is a drill-in fluid system.

13. The drilling fluid system of claim 2 wherein the drilling fluid system is a completion fluid system.

14. The drilling fluid system of claim 1 wherein the first amount is sufficient to produce a concentration of alkali metal silicate in the drilling fluid system of about 1 vol. % or more.

15. The drilling fluid system of claim 14 wherein the water insoluble particulate consists essentially of mesh sizes of from about 10 to about 500 mesh.

16. The drilling fluid system of claim 15 wherein the circulation loss structure is effective to reduce circulation loss to 40% or less of the circulation loss experienced by a control comprising the same drilling fluid system in the absence of the circulation loss combination when measured through a 100 Darcy disk at 250° F.

17. The drilling fluid system of claim 15 wherein the circulation loss structure is effective to reduce circulation loss to 80% or less of the circulation loss experienced by a control comprising the same drilling fluid system in the absence of the circulation loss combination when measured through a 100 Darcy disk at 250° F.

18. The drilling fluid system of claim 15 wherein the circulation loss structure is effective to reduce circulation loss to 90% or less of the circulation loss experienced by a control comprising the same drilling fluid system in the absence of the circulation loss combination when measured through a 100 Darcy disk at 250° F.

19. The drilling fluid system of claim 14 wherein the concentration of alkali metal silicate is about 20 vol. % or less.

20. The drilling fluid system of claim 1 further comprising one or more water soluble polymer.

21. The drilling fluid system of claim 20 wherein the water soluble polymer is partially hydrolyzed polyacrylamide.

22. The drilling fluid system of claim 1 wherein the water insoluble particulates comprise cellulosic fibers.

23. The drilling fluid system of claim 22 comprising from about 5 lb/bbl to about 200 lb/bbl of the water insoluble particulate.

24. The drilling fluid system of claim 22 wherein the cellulosic fibers are selected from the group consisting of corn cob, nut shells, seeds, pith, and combinations thereof.

25. The drilling fluid system of claim 1 wherein the water insoluble particulates comprise calcium carbonate particles.

26. The drilling fluid system of claim 25 comprising from about 5 lb/bbl to about 200 lb/bbl of the water insoluble particulate.

27. The drilling fluid system of claim 1 wherein the water insoluble particulates comprise high lignin lost circulation material.

28. The drilling fluid system of claim 27 wherein the high lignin lost circulation material is selected from the group consisting of grape pumice, bulrush plants, lignin byproducts from processing plant material into paper, and combinations thereof.

29. The drilling fluid system of claim 1 wherein the alkali metal is selected from the group consisting of lithium, sodium, and potassium.

30. The drilling fluid system of claim 1 wherein the first amount is sufficient to produce a concentration of alkali metal silicate in the drilling fluid System of about 2 vol. % or more.

31. The drilling fluid system of claim 1 wherein the first amount is sufficient to produce a concentration of alkali metal silicate in the drilling fluid system of about 3 vol. % or more.

32. The drilling fluid system of claim 1 wherein the activating agent is water soluble ester.

33. The drilling fluid system of claim 1 wherein the activating agent is water soluble alkyl ester.

34. The drilling fluid system of claim 1 wherein the activating agent is selected from the group consisting of water soluble alkyl esters of aliphatic saturated or unsaturated monocarboxylic, dicarboxylic, and polycarboxylic acids and salts therefore, alkyl esters of caibocyclic carboxylic acids and salts therefore; dialkyl and/or trialkyl phosphates; lactones; lower alkylamides; ketoesters; and, carbonates and bicarbonates, and combinations thereof.

35. The drilling fluid system of claim 1 wherein the activating agent comprises formamide.

36. The drilling fluid system of claim 1 wherein the activating agent comprises ethyl ester.

37. The drilling fluid system of claim 1 further comprising an accelerating agent comprising a water soluble salt.

38. The drilling fluid system of claim 1 further comprising an accelerating agent comprising sodium aluminate.

39. The drilling fluid system of claim 1 wherein the water insoluble particulate consists essentially of mesh sizes of from about 100 to about 200 mesh.

40. The drilling fluid system of claim 1 wherein the water insoluble particulates are selected from the group consisting of alkaline earth metal salts, metals, metal oxides, silica, ceramics, and combinations thereof.

41. The drilling fluid system of claim 1 wherein the water insoluble particulates are selected from the group consisting of alkaline earth metal salts, organic fibers, and combinations thereof.

42. The drilling fluid system of claim 1 wherein the water insoluble particulates comprise alkaline earth metal carbonates.

43. The drilling fluid system of claim 1 comprising about 20 lb/bbl of the water insoluble particulate wherein the water insoluble particulate comprises calcium carbonate particles.

44. The drilling fluid system of claim 1 wherein the desired period of time is about 1 hr. or more.

45. The drilling fluid system of claim 1 wherein the desired period of time is about 5 hr. or more.

46. The drilling fluid system of claim 1 wherein the circulation loss structure is effective to reduce circulation loss to 40% or less of the circulation loss experienced by a control comprising the same drilling fluid system in the absence of the circulation loss combination when measured through a 100 Darcy disk at 250° F.

47. The drilling fluid system of claim 1 wherein the circulation loss structure is effective to reduce circulation loss to 80% or less of the circulation loss experienced by a control comprising the same drilling fluid system in the absence of the circulation loss combination when measured through a 100 Darcy disk at 250° F.

48. The drilling fluid system of claim 1 wherein the circulation loss structure is effective to reduce circulation loss to 90% or less of the circulation loss experienced by a control comprising the same drilling fluid system in the absence of the circulation loss combination when measured through a 100 Darcy disk at 250° F.

49. The drilling fluid system of claim 1 wherein the drilling fluid system is selected from the group consisting of a drilling fluid system, a drill-in fluid system, a completion fluid system, a workover fluid system, a cementing fluid system, a well-servicing fluid system, a gravel-packing fluid system, a spotting fluid system, and an additive fluid system.

50. The drilling fluid system of claim 1 wherein the drilling fluid system is a drill-in fluid system.

51. The drilling fluid system of claim 1 wherein the drilling fluid system is a completion fluid system.

52. The drilling fluid system of claim 1 wherein the water insoluble particulates comprise an organic fiber blend comprising about 75 wt. % ground corn cob and about 25 wt. % of second organic fiber material selected from the group consisting of ground nut shells, wood flour, and combinations thereof.

53. The drilling fluid system of claim 1 wherein the water soluble activating agent is effective to reduce the pH of the water-based drilling fluid system to 11 or lower.

54. A drilling fluid system comprising:
a water based-drilling fluid system having effective rheology and fluid loss control properties, the water based-drilling fluid system comprising a circulation loss combination;
wherein the circulation loss combination comprises:
from about 2 vol. % to about 5 vol. % of sodium silicate;
from about 10 lb/bbl. to about 30 lb/bbl. of calcium carbonate; and,
from about 1 vol. % to about 3 vol. % water soluble alkyl ester.

55. The drilling fluid system of claim 54 wherein the water soluble polymer further comprises from about 0.1 vol. % to about 2 vol. % partially hydrolyzed polyacrylamide.

56. The drilling fluid system of claim 55 wherein the water soluble alkyl ester is ethyl ester.

57. The drilling fluid system of claim 56 wherein the drilling fluid system is selected from the group consisting of a drill-in fluid and a completion fluid.

58. The drilling fluid system of claim 54 wherein the alkali metal silicate and the water insoluble particulate are integral components of the Water-based drilling fluid system and the water soluble activating agent comprises a separate additive.

59. The drilling fluid system of claim 58 wherein the water soluble alkyl ester is ethyl ester.

60. The drilling fluid system of claim 58 wherein the drilling fluid system is selected from the group consisting of a drill-in fluid and a completion fluid.

61. The drilling fluid system of claim 54 wherein the drilling fluid system further comprises from about 0.1 vol. % to about 2 vol. % water soluble polymer.

62. The drilling fluid system of claim 61 wherein the drilling fluid system is selected from the group consisting of a drill-in fluid and a completion fluid.

63. The drilling fluid system of claim 54 wherein the water soluble alkyl ester is ethyl ester.

64. The drilling fluid system of claim 54 wherein the drilling fluid system is selected from the group consisting of a drill-in fluid and a completion fluid.

65. A drilling fluid system comprising:
a water based-drilling fluid system having effective rheology and fluid loss control properties, the water based-drilling fluid system comprising a circulation loss combination comprising:
from about 2 vol. % to about 40 vol. % active sodium silicate;
about 20 lb/bbl calcium carbonate; and,
from about 0.1 vol. % to about 20 vol. % of water soluble alkyl ester.

66. The drilling fluid system of claim 65 wherein the alkyl ester is ethyl ester, and the combination comprises about 2.7 vol. % sodium silicate and about 1.3 vol. % ethyl ester.

67. The drilling fluid system of claim 66 wherein the drilling fluid system is selected from the group consisting of a drill-in fluid and a completion fluid.

68. The drilling fluid system of claim 65 wherein the drilling fluid system comprises about 1.5 lb/bbl water soluble polymer.

69. The drilling fluid system of claim 68 wherein the drilling fluid system is selected from the group consisting of a drill-in fluid and a completion fluid.

70. The drilling fluid system of claim 65 further comprising about 1.5 lb/bbl partially hydrolyzed polyacrylamide.

71. The drilling fluid system of claim 70 wherein the drilling fluid system is selected from the group consisting of a drill-in fluid and a completion fluid.

72. The drilling fluid system of claim 65 wherein the drilling fluid system is selected from the group consisting of a drill-in fluid and a completion fluid.

* * * * *

UNITED STATES PATENT AND TRADEMARK OFFICE
CERTIFICATE OF CORRECTION

| | | |
|---|---|---|
| PATENT NO. | : 7,226,895 B2 | Page 1 of 1 |
| APPLICATION NO. | : 10/818594 | |
| DATED | : June 5, 2007 | |
| INVENTOR(S) | : Xiang Tao | |

It is certified that error appears in the above-identified patent and that said Letters Patent is hereby corrected as shown below:

Column 9, line 35 delete "System" and insert --system--

Column 9, line 49 delete "caibocyclic" and insert --carbocyclic--

Column 11, line 8 delete "Water-based" and insert --water-based--

Signed and Sealed this

Seventh Day of August, 2007

JON W. DUDAS
*Director of the United States Patent and Trademark Office*